(12) United States Patent
Tracey (10) Patent No.: US 9,259,968 B2
(45) Date of Patent: Feb. 16, 2016

(54) WHEEL LOCK

(71) Applicant: GREAT STUFF, INC., Austin, TX (US)

(72) Inventor: James B. A. Tracey, Austin, TX (US)

(73) Assignee: GREAT STUFF, INC., Austin, TX (US)

( * ) Notice: Subject to any disclaimer, the term of this patent is extended or adjusted under 35 U.S.C. 154(b) by 456 days.

(21) Appl. No.: 13/725,102

(22) Filed: Dec. 21, 2012

(65) Prior Publication Data

US 2013/0181502 A1   Jul. 18, 2013

Related U.S. Application Data

(60) Provisional application No. 61/580,609, filed on Dec. 27, 2011, provisional application No. 61/582,127, filed on Dec. 30, 2011.

(51) Int. Cl.
| | |
|---|---|
| *B60B 37/10* | (2006.01) |
| *B60B 37/00* | (2006.01) |
| *F16D 11/14* | (2006.01) |
| *B60T 1/00* | (2006.01) |
| *B60B 33/00* | (2006.01) |
| *F16H 21/54* | (2006.01) |

(52) U.S. Cl.
CPC .............. *B60B 37/00* (2013.01); *B60B 33/0063* (2013.01); *B60B 33/0084* (2013.01); *B60B 37/10* (2013.01); *B60T 1/005* (2013.01); *F16D 11/14* (2013.01); *B60B 2900/351* (2013.01); *F16H 21/54* (2013.01); *Y10T 74/1892* (2015.01)

(58) Field of Classification Search
CPC ......... F16D 11/14; B60B 37/00; B60B 37/06; B60B 33/0084; B60B 33/0078; B60B 33/0063; B60B 37/10; B60T 1/005; B60T 1/02; B62C 7/02
USPC ........ 188/69, 24.19, 71.1, 266.4, 278, 19, 20; 301/6.1, 121, 122, 111.01, 111.06, 301/111.07, 111.04; 403/83, 104; 16/45; 280/33.994
See application file for complete search history.

(56) References Cited

U.S. PATENT DOCUMENTS

| | | | | |
|---|---|---|---|---|
| 3,351,364 | A * | 11/1967 | Warn et al. ........................ | 403/1 |
| 5,381,981 | A * | 1/1995 | Nelson ........................ | 242/407.1 |
| 5,408,854 | A * | 4/1995 | Chiu ............................... | 70/225 |
| 5,902,018 | A * | 5/1999 | Owen et al. ............... | 301/111.04 |
| 6,170,615 | B1 * | 1/2001 | Cheng ............................ | 188/20 |
| 6,425,797 | B1 * | 7/2002 | Wu ................................. | 446/330 |
| 2004/0188558 | A1* | 9/2004 | Moon et al. ................. | 242/403.1 |
| 2008/0185236 | A1* | 8/2008 | Chen et al. ...................... | 188/20 |
| 2010/0050376 | A1* | 3/2010 | Tsang ............................... | 16/45 |

* cited by examiner

*Primary Examiner* — Kip T Kotter
(74) *Attorney, Agent, or Firm* — Knobbe, Martens, Olson & Bear LLP (57) ABSTRACT

A wheel lock configured for use in a movable apparatus is disclosed herein. In various embodiments, the movable apparatus can include a leg structure and a wheel rotatably mounted with respect to the leg structure. A wheel lock can extend through the wheel. The lock can have a first position in which the lock prevents rotation of the wheel from rotating and a second position in which the lock does not prevent rotation of the wheel. The second position can be axially displaced relative to the first position.

19 Claims, 9 Drawing Sheets

FIG. 9

WHEEL LOCK

CROSS-REFERENCE TO RELATED APPLICATIONS

This application claims the benefit of U.S. Provisional Patent Application No. 61/580,609, filed Dec. 27, 2011, entitled "WHEEL LOCK," and U.S. Provisional Patent Application No. 61/582,127, filed Dec. 30, 2011, entitled "WHEEL LOCK," each of which is hereby incorporated by reference in its entirety and for all purposes, and should be considered part of this specification.

BACKGROUND

1. Field

The field relates to a wheel lock, and in particular, to a wheel lock operably coupled to a wheel of a movable apparatus.

2. Description of the Related Art

Conventional hose reel devices may include one or more wheels to allow the user to move the hose reel device between locations during operation of the device. However, when the user pulls the hose or otherwise contacts the device during operation, conventional hose reel devices may roll if the wheels are not locked. Allowing the hose reel device to roll freely during operation may prevent the user from enjoying a stationary platform from which to operate the device. Thus, although it can be advantageous to selectively permit the hose reel device to roll, there is a continuing need for devices and apparatus that can prevent the hose reel device from rolling when the user so desires.

SUMMARY

In one embodiment, the present application provides a movable apparatus comprising a leg structure, at least one wheel rotatably mounted with respect to the leg structure, and a wheel lock extending through the wheel along a longitudinal axis of the wheel. The wheel lock can be configured to slide relative to the wheel and can have a first position in which the lock prevents rotation of the wheel. The wheel lock can have a second position in which the lock does not prevent rotation of the wheel. The second position can be axially displaced relative to the first position along the longitudinal axis of the wheel.

In another embodiment, a wheel locking system is disclosed. The wheel locking system can include an axle comprising an internal passage oriented along a longitudinal axis of the axle. A wheel can be rotatably engaged with the axle, so that the wheel is rotatable about the longitudinal axis of the axle. A wheel lock can be positioned within the internal passage of the axle. The wheel lock can be movable within the passage along the longitudinal axis between a first position and a second position. The wheel lock prevents the wheel from rotating about the longitudinal axis when the wheel lock occupies the first position. The wheel lock does not prevent the wheel from rotating about the longitudinal axis when the wheel lock occupies the second position.

In yet another embodiment, a wheel locking system is disclosed. The wheel locking system can have an axle comprising an internal passage oriented along a longitudinal axis of the axle. A wheel cover can be connected with respect to the axle, and can be configured to cover a wheel rotatably engaged with the axle. The wheel cover can include a sidewall at an end of the axle. The sidewall can be oriented generally transversely with respect to the axle, and can include one or more apertures radially outward of the axle. A wheel lock can have a stem portion positioned within the internal passage of the axle, and an end-piece secured to the stem portion. The end-piece can include one or more projections extending longitudinally toward the axle. The wheel lock can be movable within the passage along the longitudinal axis between a first position and a second position. The sidewall can be interposed between the end-piece and the axle. When the wheel lock occupies its first position, the one or more projections of the end-piece extend through the one or more apertures of the sidewall into an interior of the wheel cover.

In another embodiment, a wheel lock is disclosed. The wheel lock can have a sliding lock member having an end-piece and an elongated first stem extending from the end-piece. A sliding release member can include an end and an elongated second stem extending from the end and configured to engage with the first stem. A detent member can be positioned within at least one of the first and second stems. The detent member can have at least one projection that is biased to extend radially outwardly through a corresponding aperture within one of the stems. The projection can be configured to retract radially inwardly when a radially inward force exerted on the projection overcomes the radially outward bias of the projection.

For purposes of summarizing the invention, certain objects and advantages of the invention have been described above and as further described below. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

A more detailed description of various embodiments of the wheel lock and components thereof are set forth below. The figures are not necessarily drawn to scale.

DETAILED DESCRIPTION

The present application discloses a wheel lock system for a mobile apparatus, such as a cart or reel. In various embodiments, the wheel lock system is applied to wheels or rollers of a reel for winding and unwinding a linear material, such as a hose or electrical cord. In various embodiments, the wheel lock system is applied to a leg structure mounted to a housing of a reel, such as a hose reel device. Exemplary reel housings and leg structures suitable for wheel lock systems according to embodiments of the present application are disclosed in U.S. Patent Application Publication No. US-2009-0057472-A1 to James B. A. Tracey. Exemplary reel systems suitable for provision within such housings are disclosed in U.S. Patent Application Publication No. US-2006-0266868-A1 to Caamano et al., and U.S. Pat. No. 7,419,038 to Caamano et al.

Various mobile apparatuses, for example, can include one or more wheels to enable a user to move the apparatus during operation. During operation of the mobile apparatus, it can be desirable to selectively engage and disengage a wheel lock operably connected to the wheel(s). For example, for a hose reel or cord reel, if the user is operating the hose or cord at a particular location and the user desires to operate from a relatively stationary platform, engaging the wheel lock may prevent the reel apparatus from rolling when the user pulls at the hose or cord, or otherwise contacts the reel apparatus. When the user is ready to move to a different location, the user may disengage the wheel lock to allow the reel apparatus to roll to a new location. Further, to simplify the use of the mobile apparatus, it can be desirable to provide a wheel lock that is easy to engage and/or disengage. Wheel locks that require complicated user actions to engage or disengage the lock may cause the mobile apparatus to be unwieldy and difficult to maneuver. Accordingly, it can be advantageous to incorporate a wheel lock into various movable devices that is reliable and easy to engage and disengage.

In various embodiments disclosed herein, a user-engageable wheel lock for a movable apparatus (e.g., a hose or cord reel device) is disclosed. The disclosed wheel lock can have an engaged or locked position, and a disengaged or unlocked position. In the engaged position, the wheel of the movable apparatus can be prevented from rolling. In the disengaged position, the wheel can be free to roll. The disclosed wheel lock can made such that a user can easily engage and disengage the lock. For example, when the user wants to operate the movable apparatus from a stationary position, the user may engage the wheel lock by sliding it axially through the wheel in a first longitudinal direction. In some arrangements, the user can kick the lock with his or her foot, or press the lock by hand, to slide it into the locked position. When the user wants to move the movable apparatus, the user may simply disengage the wheel lock by sliding it in a second longitudinal direction opposite the first direction (e.g., by kicking the lock with his/her foot or pressing the lock with his/her hand) until the lock reaches the unlocked position. Once the lock reaches the second position, the wheel lock may be disengaged, and the movable apparatus may be able to roll freely to the next location.

Figure 1:
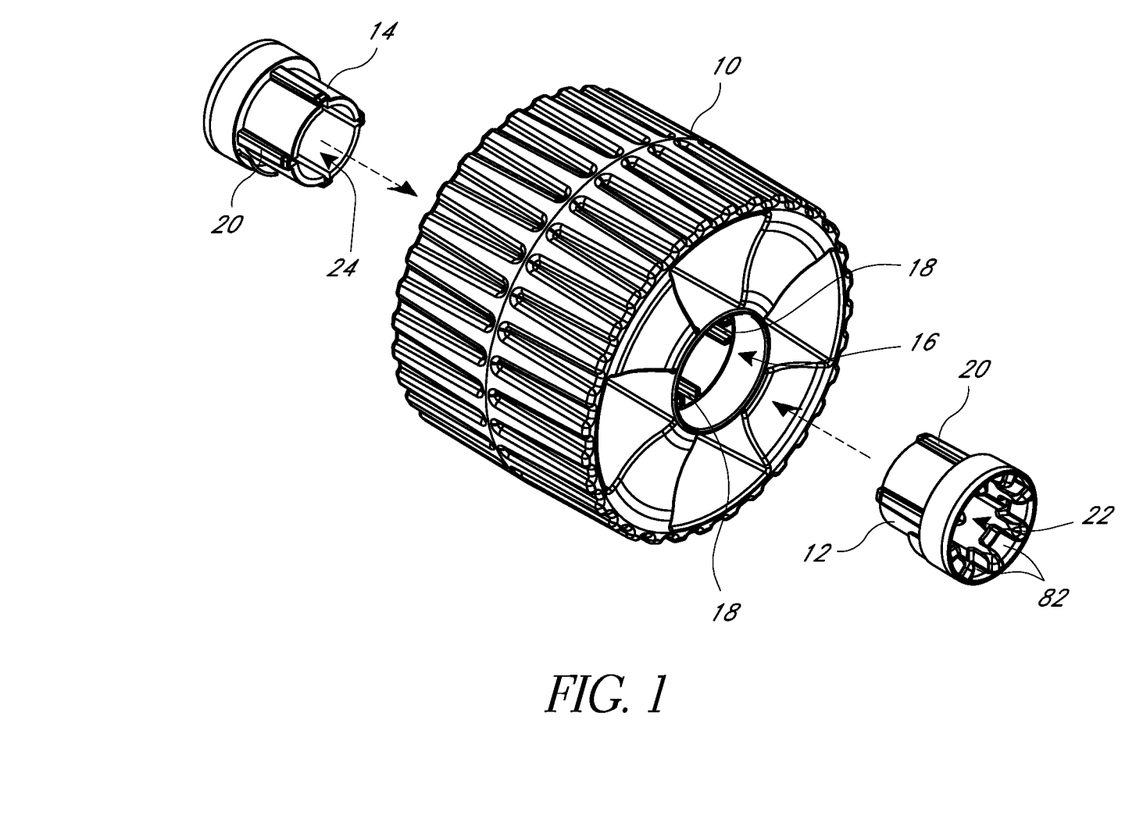
FIG. 1 is a perspective exploded view of an embodiment of a wheel and bushing lock for a mobile apparatus.

FIG. 1 is a perspective exploded view of an embodiment of a wheel 10 and bushing lock 12, 14 for a mobile apparatus. For example, the wheel 10 and bushing lock 12, 14 may be implemented in any suitable movable apparatus, such as a hose or cord reel device. The bushing lock includes a first member 12 and a second member 14 adapted to slide into a central passage 16 of the wheel 10. There may be a relatively tight fit between the first and second members 12, 14 and the central passage 16, for example, in order to secure the first and second members 12, 14 to the wheel 10. The passage 16 includes grooves 18 adapted to receive splines or tongues 20 of the bushing lock members 12, 14. In the illustrated embodiment, a plurality of grooves 18 and corresponding tongues 20 are provided about the circumference of the passage 16 and bushing lock members 12, 14, respectively. However, it can be sufficient to only have one groove 18 and corresponding tongue 20 for each bushing lock member 12, 14. In other embodiments, the bushing lock members 12, 14 may have grooves, and the passage 16 may have corresponding tongues. It will be appreciated that the tongue and groove engagement may prevent the bushing lock members 12, 14 from rotating with respect to the wheel 10 about the wheel's axis of rotation. The bushing lock member 12 can have an internal passage 22, and the bushing lock member 14 can have an internal passage 24. Further, the bushing lock members 12 and/or 14 may include notches 82 around the periphery of the member. As explained in more detail herein, the notches 82 may be sized and shaped to receive projections extending from the wheel lock. The notches 82 may engage the projections of the wheel lock and thereby prevent rotation of the wheel 10.

Figure 2:
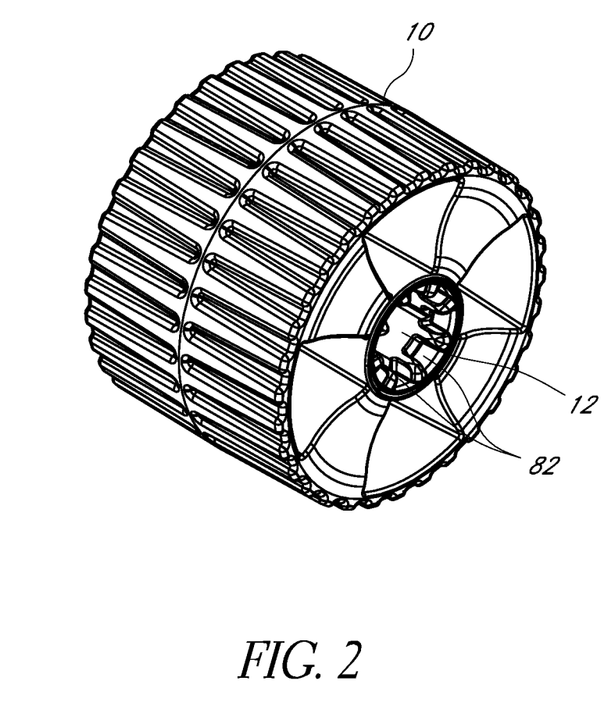
FIG. 2 is a perspective view of the wheel and bushing lock of FIG. 1, shown assembled.

FIG. 2 is a perspective view of the wheel 10 and bushing lock members 12 and 14 (not shown) of FIG. 1, shown assembled. While FIGS. 1 and 2 illustrate bushing lock members 12, 14 as members that are formed separately from the wheel 10, in some embodiments the bushing lock members 12, 14 can be integrally (e.g., monolithically) formed with the wheel 10. For example, in some aspects, there may be no need for the plurality of grooves 18. In such embodiments, the bushing lock members 12, 14 can be integrally formed with passage 16, such that the bushing lock members 12, 14 are not coupled to the grooves 18.

Figure 3:
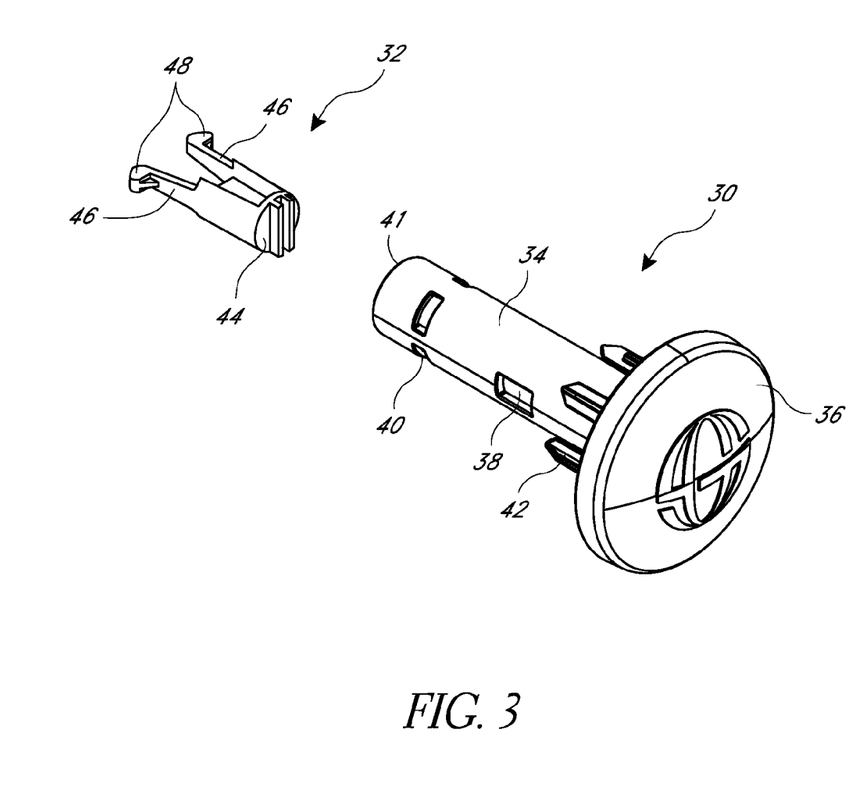
FIG. 3 is a perspective exploded view of an embodiment of a sliding lock member and a detent member.

FIG. 3 is a perspective exploded view of an embodiment of a sliding lock member 30 and a detent member 32. The sliding lock member 30 includes a hollow stem 34 and an end-piece 36, which are integrally formed together in some embodiments. The illustrated end-piece 36 is a rounded flange shape, but other shapes are possible for the end-piece 36 (e.g., flat, square, oval). The stem 34 includes apertures 38 (only one of which is visible in FIG. 3) on opposite sides of the stem body, at substantially the same longitudinal position of the stem body. The stem 34 can also have projection-engagement portions 40 near the distal end of the stem 34. In some embodiments, the projection-engagement portions 40 can have one or more holes in the tubular wall of the stem 34 (as shown) or recesses formed in an interior surface of the tubular wall. In other embodiments, the projection-engagement portions can have a circumferential groove in the inner tubular wall of the stem 34 near its distal end 41. In yet other embodiments, the projection-engagement portions 40 can be formed in an outer surface of the tubular wall of the stem and can have one or more holes or recesses or a circumferential groove. As explained below, the projection-engagement portions 40 can be sized and shaped to receive projections from a sliding release member (see, e.g., FIG. 7). The sliding release member of FIG. 7 and the sliding lock member 30 can thereby couple together to form a single stem portion extending through the wheel 10. The end-piece 36, which is disk-shaped in the illustrated embodiment, has one or more wheel locking projections 42 extending along the axis of the stem and toward the distal end 41 of the stem 34. As explained below, the wheel locking projections 42 can extend through, and engage, the notches 82 formed in the bushing lock members 12 and/or 14 to prevent the wheel 10 from rotating when the sliding lock member 30 is in a locked or engaged position.

Figure 4:
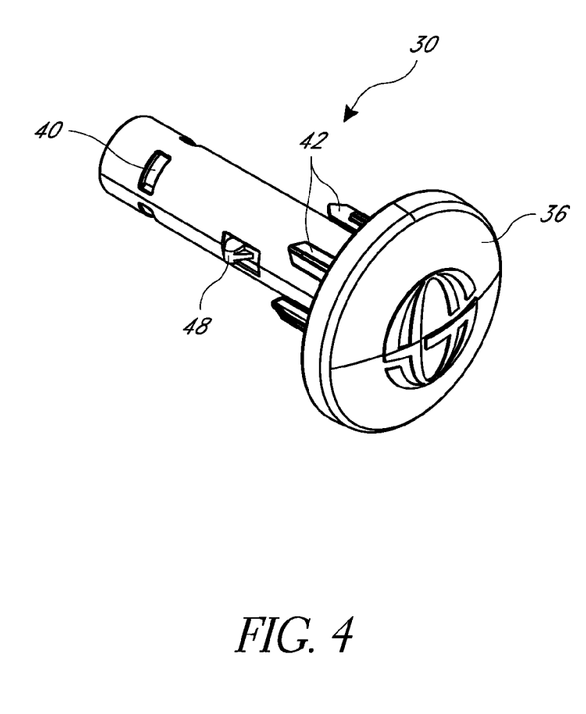
FIG. 4 is a perspective view of the sliding lock member and detent member of FIG. 3, shown assembled.

The detent member 32 has an insertion end 44 and a plurality (two in the illustrated embodiment) of flexible prongs 46 opposite the insertion end 44. Each prong 46 has a projection 48 that extends radially outward. The detent member 32 can be sized and shaped to be slidably inserted into the stem 34. The detent member 32 may be fit tightly within the stem 34 to aid in securing the detent member 32 to the stem 34. The prongs 46 may compress radially inward so that the detent member 32 fits into the stem 34. The detent member 32 can be slid into the stem 34 until the projections 48 extend through the apertures 38, which retain the detent member 32 within the stem 34. FIG. 4 is a perspective view of the sliding lock member 30 and detent member 32 (hidden within lock member 30) of FIG. 3, shown assembled. In other embodiments, the detent member 32 can be integrally formed with the sliding lock member 30. For example, in some implementations, the sliding lock member 30 can include radially compressible projections integral with and extending from the stem 34, without including the detent member 32.

Figure 5A:
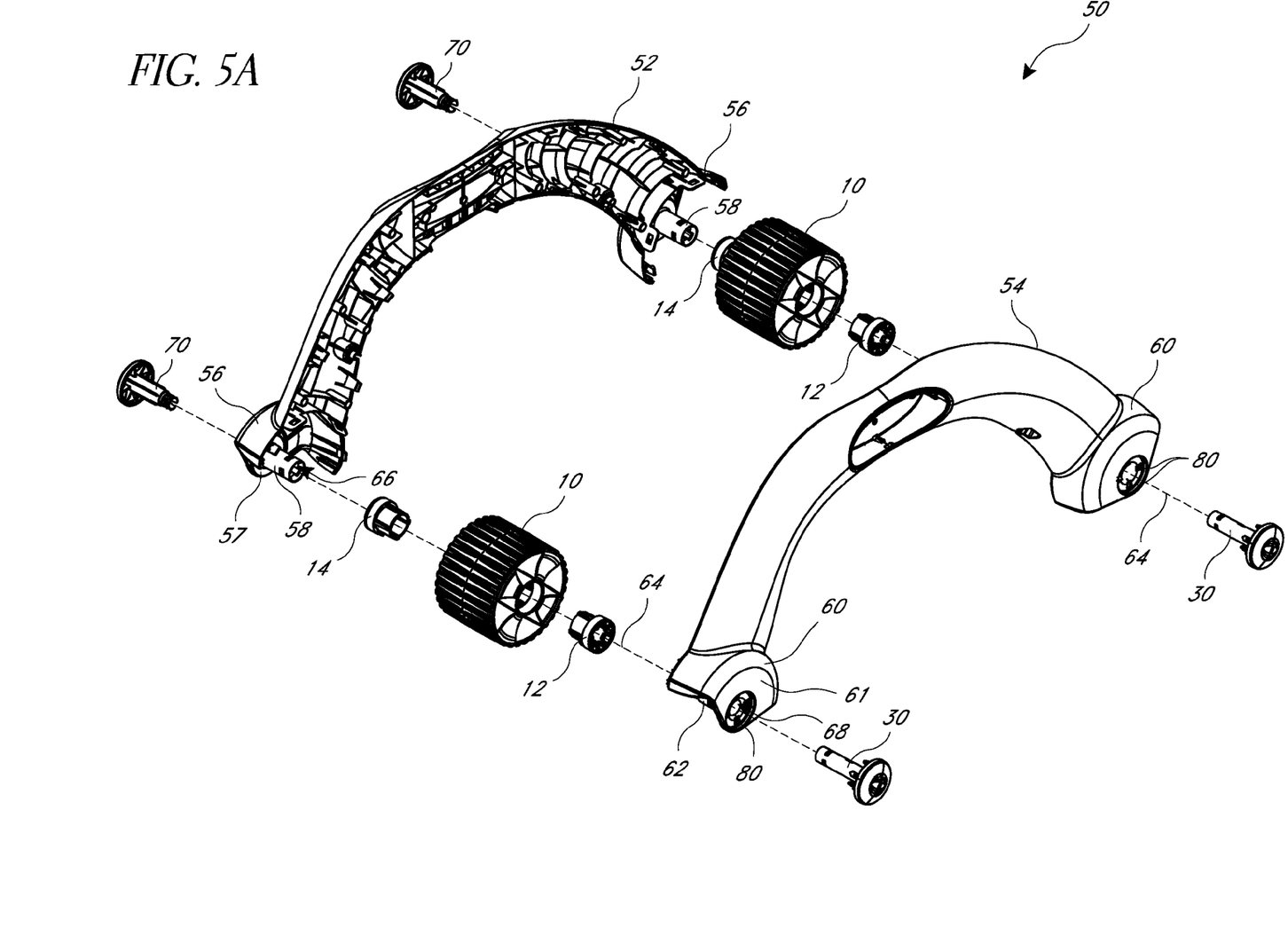
FIGS. 5A and 5B are perspective exploded views of an embodiment of a leg structure for a mobile apparatus, adapted for mounting two wheels with wheel locks.
Figure 5B:
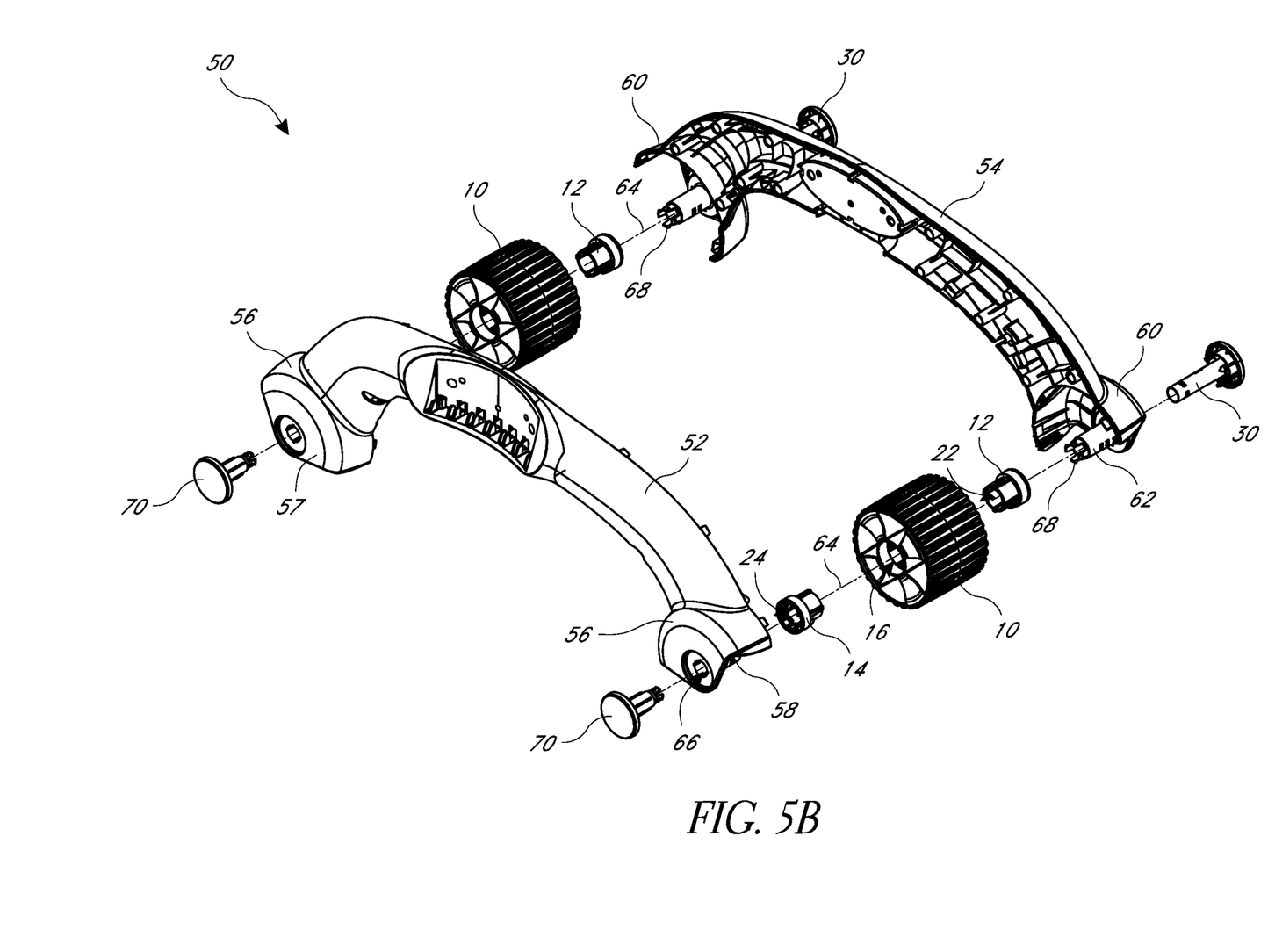

FIGS. 5A and 5B are perspective exploded views of an embodiment of a leg structure 50 for a mobile apparatus, adapted for mounting two wheels 10 with wheel locks. It will be appreciated that a mobile apparatus can have one, two, or more leg structures 50 mounted thereto. It will also be appreciated that a leg structure can have only one wheel 10 instead of two, and that the illustrated leg structure 50 is only one of many possible embodiments. The leg structure 50 can be implemented in any suitable mobile apparatus, such as a hose or cord reel device.

The illustrated leg structure 50 includes an inner body portion 52 and an outer body portion 54 secured together. For example, the inner and outer body portions 52, 54 can be secured together in any of a variety of different ways, such as via screws, nut and bolt combinations, inter-engaging flexible snap-fit members, or the like. The leg structure 50 is preferably adapted to be mounted to a housing of a mobile apparatus, such as a reel. In preferred embodiments, the inner body portion 52 is connected to the housing, such as by bolts or the like extending through the inner body portion 52 or through both body portions 52, 54. The lower ends of the body portions 52, 54 define mounting structures for the wheels 10. Each of the lower ends of the inner body portion 52 includes a wheel cover portion 56 and an axle portion 58. The wheel cover portion 56 includes a side wall 57. Similarly, each of the lower ends of the outer body portion 54 includes a wheel cover portion 60 and an axle portion 62. The wheel cover portion 60 includes a side wall 61. The axle portion 58 has an internal passage 66 defined by a tubular wall of the axle portion 58, and the axle portion 62 has an internal passage 68 defined by a tubular wall of the axle portion 62.

With reference to FIGS. 1, 5A, and 5B, the body portions 52 and 54 can be assembled together with the wheels 10 therebetween (e.g., between the cover portions 56, 60). When the body portions 52 and 54 are assembled together, the axle portion 58 is inserted into the passage 24 of the second bushing lock member 14, and the axle portion 62 is inserted into the passage 22 of the first bushing lock member 12. Upon assembly, the axle portions 58, 62 can jointly form a single axle extending through a rotational axis of the wheel 10, e.g., the central passage 16 described with respect to FIG. 1. In some embodiments, the axle portions 58, 62 can mechanically couple. For example, in some aspects, the axle portion 62 can include extensions that can be received in a recess (or hole) within the tubular wall of the axle portion 58. In other implementations, the axle portion 58 can include extensions that can be received in a recess (or hole) within the tubular wall of the axle portion 62. Further, the axle portions 58, 62 can be mechanically coupled using an adhesive or any other suitable coupling known to those skilled in the art. In addition, when the body portions 52, 54 of the leg structure 50 are assembled, the internal passages 66, 68 of the axle portions 58, 62 can jointly form a single internal passage of the single axle formed by axle portions 58, 62. The single internal passage can extend along a longitudinal axis of the single axle, and the wheel 10 can be rotatably engaged with the single axle such that the wheel 10 can rotate about the longitudinal axis of the single axle. In the assembled state, the wheels 10 may be adapted to rotate substantially freely with respect to the leg structure 50 about a longitudinal axis 64 defined by the axle portions 58 and 62. When the body portions 52 and 54 are assembled together, the cover portions 56 and 60 are preferably joined together to form a cover for the wheel 10.

Figure 6:
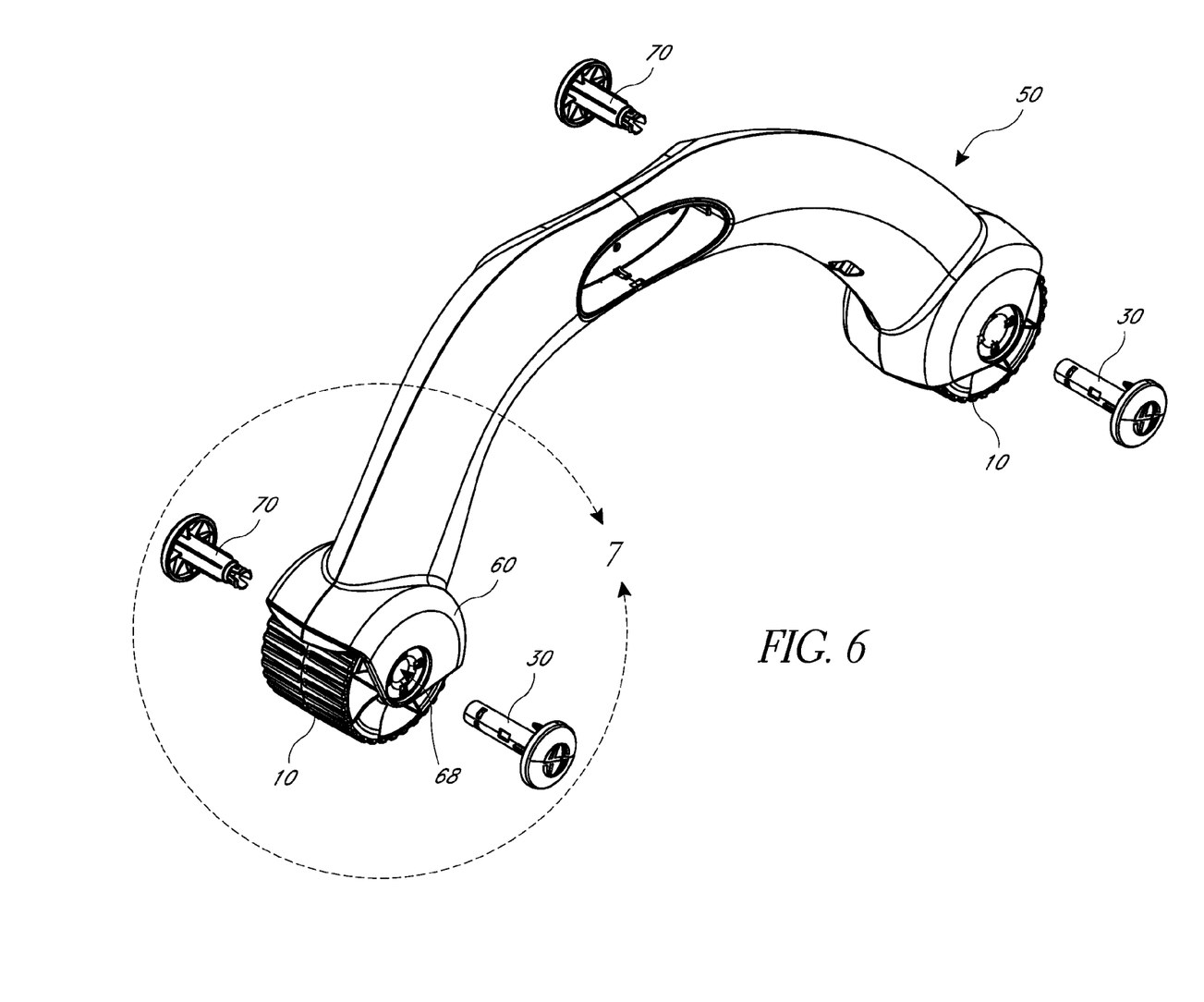
FIG. 6 is a perspective exploded view of the leg structure of FIGS. 5A and 5B, including, for each wheel, a sliding lock member and a sliding release member, in accordance with an embodiment.
Figure 7:
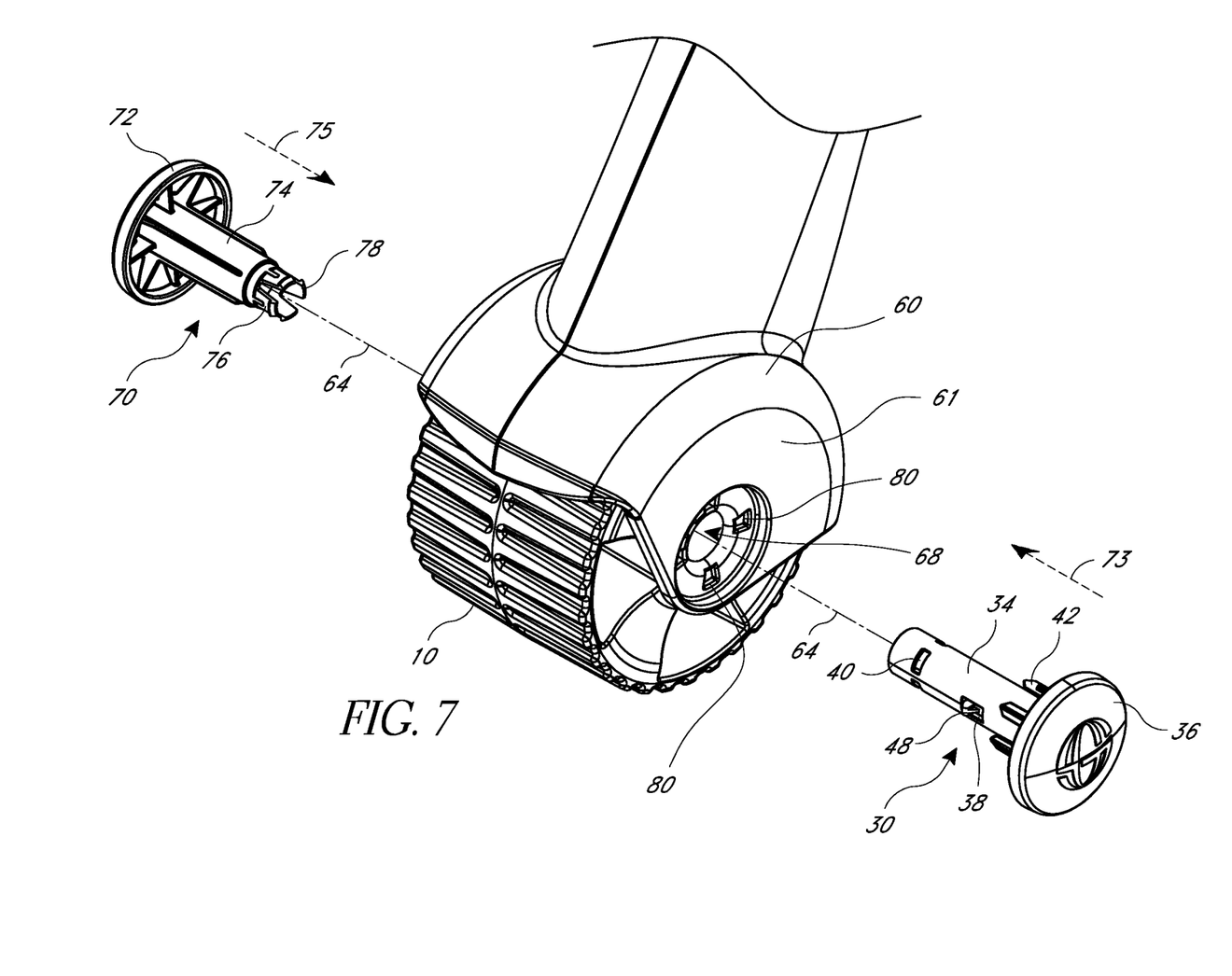
FIG. 7 is a magnified perspective view of a wheel of FIG. 6, including one sliding lock member and one sliding release member.

FIG. 6 is a perspective exploded view of the leg structure 50 of FIGS. 5A and 5B, including, for each wheel 10, a sliding lock member 30 and a sliding release member 70, in accordance with an embodiment. In FIG. 6, the leg structure 50 is assembled such that cover portions 56 and 60 are coupled together, except the sliding lock member 30 and the sliding release member 70 are shown in an exploded view. The sliding lock member 30 and the sliding release member 70 are also illustrated in FIGS. 5A and 5B. FIG. 7 is a magnified perspective view of one of the wheels 10 of FIG. 6, including one sliding lock member 30 and one sliding release member 70. The sliding lock member 30, the detent member 32 (which can be fitted within sliding lock member 30 as described above), and the sliding release member 70 can collectively form a single wheel lock when assembled. With reference to FIGS. 5A-7, the sliding lock member 30 can be slidably inserted into the internal passage 68 of the axle portion 62 of the outer body portion 54. The sliding release member 70 can be slidably inserted into the internal passage 66 of the axle portion 58 of the inner body portion 52.

The sliding release member 70 includes an end-piece 72 and a stem 74. In the illustrated embodiment, the end-piece 72 is a disk-shaped flange, but it can have other shapes (e.g., flat, square, oval). The stem 74 has an insertion end with a plurality (four in the illustrated embodiment) of flexible prongs 76. Each prong 76 has a radially outwardly extending projection 78. The prongs 76 and stem 74 can be inserted into the interior of the stem 34 of the sliding lock member 30. The prongs 76 and stem 74 may fit within the stem 34 when the prongs 76 are compressed radially inward. The stem 74 can slide within the stem 34 until the projections 78 engage with the projection-engagement portions 40 of the stem 34, described above with respect to FIG. 3. The projection-engagement portions 40 can be formed in the inner wall of the stem 34. In the illustrated embodiment, the projection-engagement portions 40 have apertures in the tubular wall of the stem, and the projections 78 extend radially outward through the apertures. The stem 74 of the sliding release member 70 can thus mechanically couple to the stem 34 of the sliding lock member 30, so that the stems 34, 74 form a single stem portion of the wheel lock.

In some embodiments, the projections 78 can engage a variety of structures (e.g., various types of projection-engagement portions 40) to couple the sliding release member 70 with the sliding lock member 30. For instance, as described above, the projections 78 can engage a plurality of holes or recesses (examples of projection-engagement portions 40) in the interior wall of the stem 34. In embodiments where the stem 34 includes a plurality of holes or recesses for engaging the projections 78, the holes or recesses can be substantially circumferentially aligned, and each hole or recess can correspond to a different projection 78. Each projection 78 can thus be received and secured within the corresponding hole or recess. In addition, the projections 78 can have an annular ring structure that can be received in the projection-engagement portions or other receiving structure in the sliding lock member 30. Skilled artisans will recognize that other means of coupling the sliding release member 70 to the stem 34 of the sliding lock member 30 are possible and within the scope of this application. As described herein, the structures may receive the projections 78 (e.g., holes, recesses, circumferential groove, etc.) in the stem 34 can generally be considered projection-engagement portions 40 of the stem 34.

In yet other embodiments (not illustrated) of the projection-engagement portions 40 of the stem 34, the sliding release member 70 may not slide within the stem 34. In such embodiments, the projections 78 and/or prongs 76 can engage projection-engagement portions on the outer surface of the tubular wall of the stem 34 of the sliding lock member 30. For example, the projections 78 and/or prongs 76 can engage a circumferential groove (or one or more recesses or holes, as described above) on the outer surface of the tubular wall of the stem 34 by sliding over the distal end 41 of the stem 34 and engaging the circumferential groove (or holes or recesses) on the outer tubular wall of the stem 34. As above, skilled artisans will recognize that other mechanisms of coupling the sliding release member 70 to the stem 34 of the sliding lock member 30 are possible and within the scope of this application.

In this position, e.g., when the projections 78 engage the projection-engagement portions 40, the sliding lock member 30 and sliding release member 70 are engaged together and effectively act as a single unitary piece. While the detent member 32 is described above as fitting within the stem 34 of the sliding lock member 30, in some embodiments, the detent member 32 can fit within an internal passageway of the stem 74 of the sliding release member 70. In these embodiments, the detent member 32 can generally function as described above with respect to FIGS. 3-4.

Reference is now made to FIGS. 1 and 7. In use, the sliding lock member 30 (which can include detent member 32) and sliding release member 70 collectively act as a wheel lock having a first position in which the lock prevents the wheel 10 from rotating, and a second position in which the lock does not hinder rotation of the wheel 10, e.g., in which the wheel is free to rotate. Thus, to engage or lock the wheel, the user can slide the wheel lock 30, 70 in a first direction 73 to the first position (e.g., the user can slide the wheel lock 30, 70 manually with his foot or hand). To disengage or unlock the wheel, the user can slide the wheel lock 30, 70 in a second, opposite direction 75 to the second position. A user can move the wheel lock 30, 70 into the first position by pushing the end-piece 36 of the sliding lock member 30 toward the wheel 10 in the first axial or longitudinal direction 73. This causes the one or more wheel locking projections 42 of the end-piece 36 to extend through one or more corresponding apertures 80 of the side wall 61 of the wheel cover portion 60. In some implementations, the user may need to rotate the wheel lock 30, 70 in order to align the wheel locking projections 42 with the apertures 80. In other implementations, however, the wheel locking projections 42 may be fixed relative to the apertures 80. The wheel locking projections 42 may pass through the apertures 80 of the cover portion 60 and may extend through and engage projection-receiving portions of the wheel 10, such as, for example, corresponding grooves, notches, or other features of the bushing lock member 12 (and or of the wheel 10) that prevent relative rotation between the wheel lock 30, 70 and the wheel 10. For example, as illustrated in FIG. 1, the bushing lock member 12 can have notches 82 that receive and engage the wheel locking projections 42. Once the wheel locking projections 42 pass through the apertures 80 of the cover portion 60 and engage the notches 82 of the bushing lock member 12 (or other anti-rotation features of the bushing lock member 12 and/or of the wheel 10), the wheel 10 is prevented from rotating with respect to the leg structure 50.

A user can unlock the wheel 10 by sliding the wheel lock 30, 70 in the second, opposite direction 75, as shown in FIG. 7. In particular, the user unlocks the wheel 10 by pushing the end-piece 72 of the sliding release member 70 toward the wheel 10 in the second direction 75. This causes the wheel locking projections 42 to disengage the notches 82 (or other anti-rotation features of the bushing lock member 12) and pass back through the apertures 80. Because the wheel locking projections 42 are not engaged with the notches 82, the wheel is free to move in the second, unlocked position.

Figure 8:
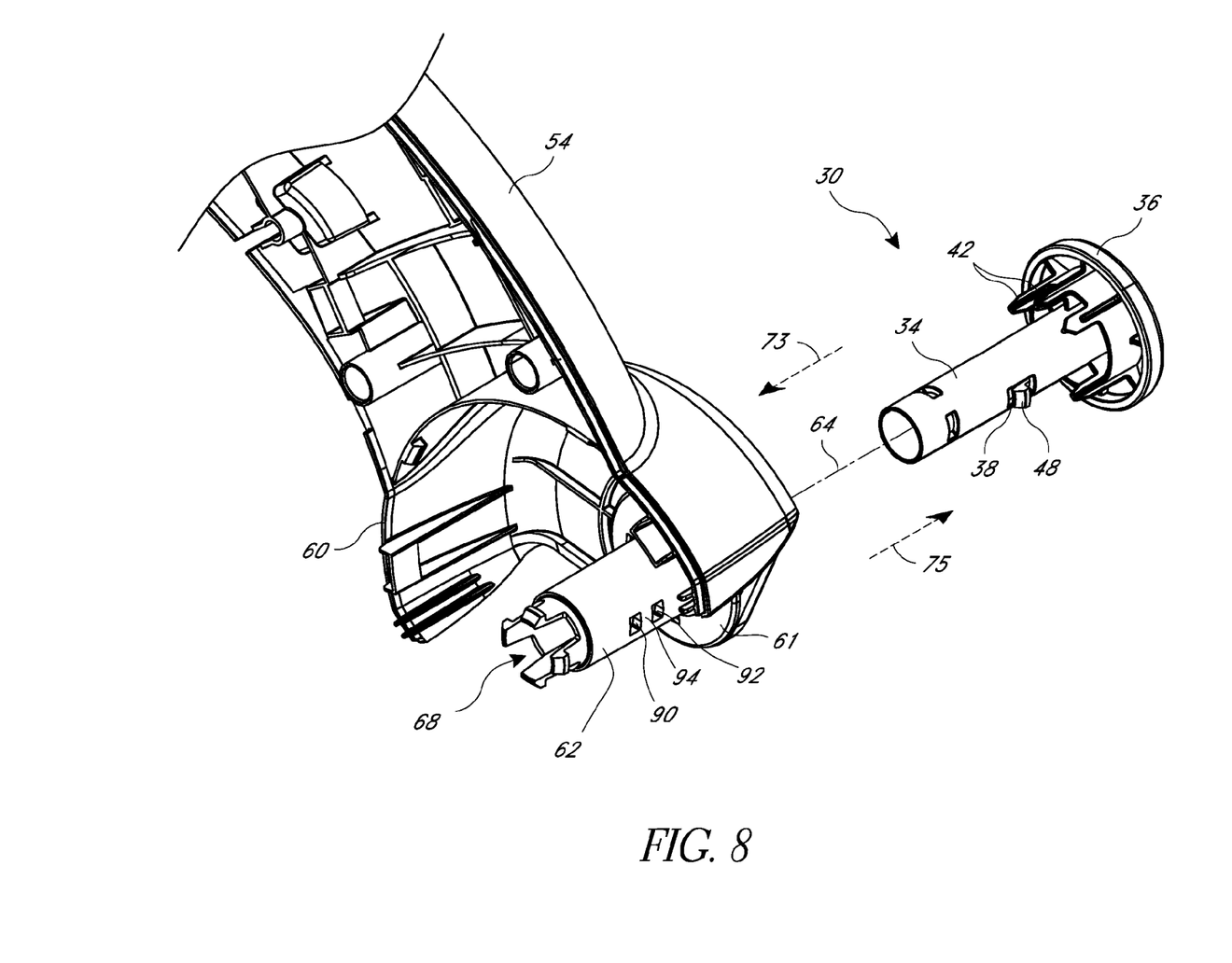
FIG. 8 is a magnified perspective view of a sliding lock member and axle portion of the leg structure of FIGS. 5A and 5B.

The detent member 32 within the sliding lock member 30 can help retain the wheel lock 30, 70 in its first or second position unless overcome by sufficient force to slide the wheel lock axially to its other position. For example, in arrangements without the detent member 32, the wheel lock 30, 70 may be unrestrained in the longitudinal direction, e.g., along the longitudinal axis 64. In such situations, the wheel may be susceptible to accidental engagement and/or disengagement when only slight forces are applied to the wheel lock 30, 70. FIG. 8 illustrates a magnified, exploded view of the sliding lock member 30 and axle portion 62 of FIGS. 5A-5B. As mentioned above, the sliding lock member 30 can be received in the internal passage 68 of the axle portion 62. The tubular wall of the axle portion 62 can further include two locking apertures 90, 92 (e.g., holes) as shown in FIG. 8. The first locking aperture 90 can be positioned along the axle portion 62, and the second locking aperture 92 can be positioned along the axle portion 62 adjacent to and spaced apart from the first locking aperture 90. The second locking aperture 92 can be located closer to the side wall 61 of the wheel cover portion 60. As illustrated, locking apertures 90, 92 are positioned at the same circumferential location along the tubular wall of the axle portion 62. However, the locking apertures 90, 92 can be spaced apart and physically separated by a divider wall 94. The divider wall 94 illustrated in FIG. 8 is shown as a narrow strip of the tubular wall separating locking apertures 90, 92. Although only one pair of locking apertures 90, 92 is illustrated in FIG. 8, there can be as many pairs of locking apertures as there are projections 48 of the detent member 32. For example, in one embodiment, there are two pairs of locking apertures that are located on opposite sides of the axle portion 62. In other embodiments, there may be more than two pairs of locking apertures circumferentially spaced apart by any desired angle.

Figure 9:
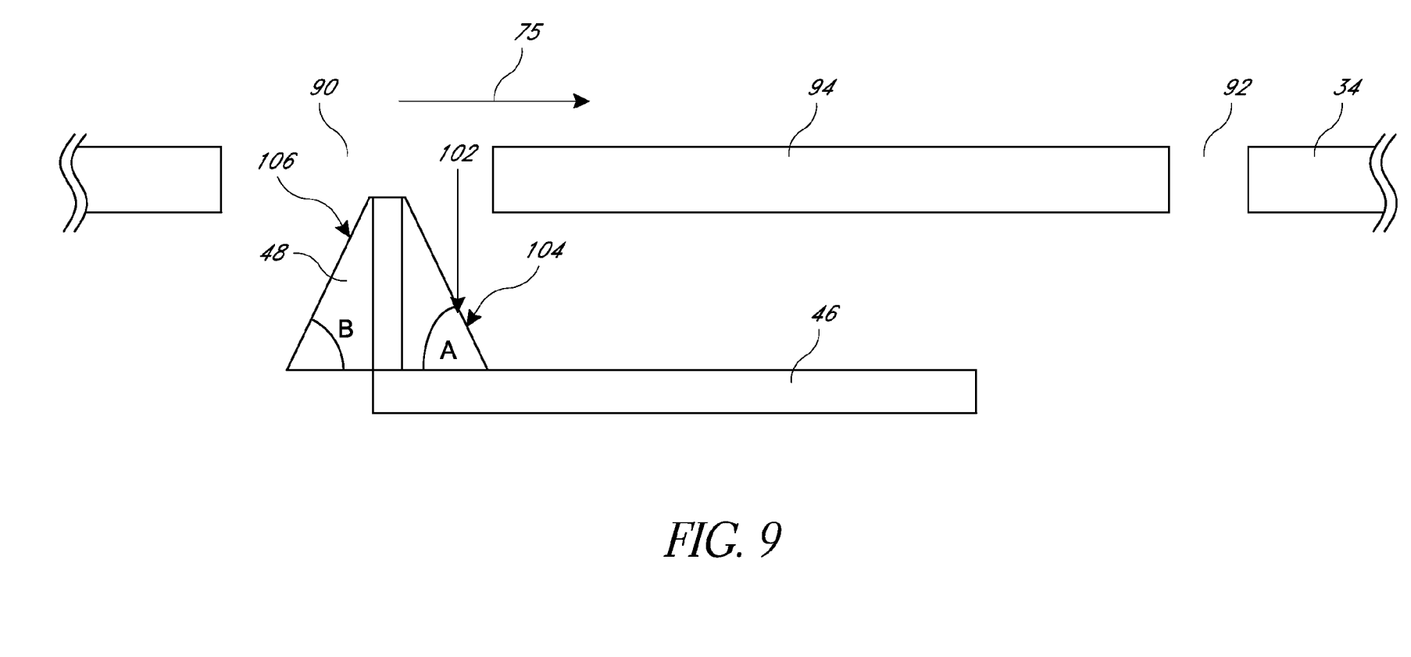
FIG. 9 is a magnified, schematic side view of projections extending from the detent member.

FIG. 9 illustrates a magnified, schematic side view of one projection 48 and one prong 46 of the detent member 32 (see, e.g., FIGS. 3-4). As mentioned above, and with reference to FIGS. 8-9, the wheel lock 30, 70 can have a first, locked position and a second, unlocked position. The user can slide the lock 30, 70 between the first and second positions to lock and unlock the wheel, respectively. In the initial unlocked position (e.g., the second position as described above), the projections 48 can be received within the second locking apertures 92 shown in FIG. 8. In this second position (corresponding to the state when the projections 48 are received within the second locking apertures 92) the wheel locking projections 42 extending from the end-piece 36 are disengaged from the projection-receiving portions of the wheel 10 (e.g., the notches 82), and the wheel 10 is free to rotate.

When the user wants to lock the wheel 10, the user applies an inward force to the end piece 36 of the sliding lock member 30 parallel to the stem 34 in the direction of the wheel 10 (e.g., in the first direction 73). This inward force can cause the projections 48 to contact the divider walls 94 of the tubular wall of the stem 34. In the illustrated embodiment, the projections 48 of the prongs 46 can compress radially inward upon contact with the divider wall 94 in order to allow the wheel lock 30, 70 to switch between its first and second positions. The projections 48 can be biased to extend radially outwardly (e.g., through one of the locking apertures 90, 92). However, when an applied radial force (e.g., with a force component normal to the stem 34) exceeds a certain threshold, the projections 48 can be inwardly compressed. Thus, if the user applies sufficient force to overcome the stiffness of the projections 48 and prongs 46, then the projections 48 and prongs 46 can correspondingly deform radially and retract into the internal passage of the stem 34. Therefore, the locking apertures 90, 92 and the divider wall 94 can operably interact with the projections 48 and prongs 46 of the sliding lock member 30 to form a wheel lock with two states—locked (engaged) and unlocked (disengaged).

As the user pushes the end-piece 36 toward the wheel 10 in the first direction 73, the retracted projections 48 can slide along an internal surface of the tubular wall of the axle portion 62. When the projections 48 reach the first locking apertures 90, past the divider wall 94, the projections 48 can again extend radially outwardly through the first locking apertures 90 due to the outward bias of the projections 48 discussed above. In this first position, the wheel 10 can thereby be locked to prevent rotation of the wheel 10, as discussed above.

To unlock the wheel 10, the user can push the end-piece 72 in the second, opposite direction 75. If the user applies sufficient force, the projections 48 can again retract into the stem 34 until the projections 48 reach the second position (unlocked), e.g., at the second locking apertures 92.

One advantage of using flexible projections 48 is that the projections 48 and prongs 46 can be tailored to have a stiffness that is high enough to prevent inadvertent actuation, but low enough to allow a user to easily actuate the wheel lock. As shown in FIG. 9, each projection 48 can have a pair of ramped surfaces 104, 106, which can form angles A and B, respectively, with respect to the prong 46. The first ramped surface 104 of the projection 48 can face the end-piece 36 of the sliding lock member 30, while the second ramped surface 106 can face the end-piece 72 of the sliding release member 70. When the wheel is being unlocked (the principles also apply for locking), the sliding lock member 30 is pushed in the second, longitudinal direction 75 (shown by an arrow) to engage the divider wall 94. In FIG. 9, therefore, the first ramped surface 104 can engage the divider wall 94 when pushed in the second longitudinal direction 75. The angle A can be designed to engage the divider wall 94 such that there is a sufficient transmitted normal force 102 (shown by arrow 102 in FIG. 9, e.g., a radially inward force) to radially compress the projection 48 when the wheel lock is pushed manually in the second longitudinal direction 75 by a user (e.g., by hand or by the user kicking the wheel lock with his/her foot). When the transmitted normal force exceeds this threshold, as described above, the projections 48 can radially retract within the stem 34 to enable longitudinal displacement of the wheel lock. Because of the geometry of the projections 48 and the divider wall 94, the threshold normal force 102 (e.g., radially inward) required to sufficiently compress the projections 48 can also be expressed in terms of a threshold longitudinal force applied by the user. In some embodiments, angles A and B of about 45° can be used to transmit a sufficient normal force (e.g., a threshold normal force) to the ramped surfaces 104, 106 of the projections 48. In other embodiments, angles A and B between about 25° and about 65° can be used, while in yet other embodiments, any other suitable angles A and B can be used. It should be noted that when A and B are close to 90°, there may not be a sufficient surface on the projections 48 to transmit a sufficient normal force 102. In various embodiments, angle A is approximately equal to angle B, while in other embodiments angle A is not equal to angle B. In some instances, the angles A and B can be very different. For example, in some embodiments, it may be desirable to require more force to unlock the wheel lock than to lock the wheel lock, or vice versa.

Although this disclosure has been described in the context of certain embodiments and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A movable apparatus comprising:
   a leg structure;
   at least one wheel rotatably mounted with respect to the leg structure by way of an axle, the axle extending within a central passage of the at least one wheel; and
   a wheel lock extending through an internal passage of the axle of the wheel along a longitudinal axis of the wheel and configured to slide relative to the wheel, the lock having a first position in which the lock prevents rotation of the wheel, the lock having a second position in which the lock does not prevent rotation of the wheel, the second position being axially displaced relative to the first position along the longitudinal axis of the wheel,
   wherein the wheel lock comprises one or more projections extending parallel to the axle, wherein, when the wheel lock occupies its first position, the one or more projections extend through corresponding apertures into an interior of the wheel, and
   wherein, when the wheel lock occupies its second position, the one or more projections do not extend into the interior of the wheel.

2. The movable apparatus of claim 1, further comprising a reel device mechanically coupled to the leg structure.

3. The movable apparatus of claim 1, wherein the internal passage of the axle is oriented along the longitudinal axis, wherein the second position is displaced relative to the first position along the longitudinal axis.

4. A wheel locking system comprising:
   an axle comprising an internal passage oriented along a longitudinal axis of the axle;

a wheel rotatably engaged with the axle, so that the wheel is rotatable about the longitudinal axis of the axle, the axle disposed within a central passage of the wheel;

a wheel lock positioned within the internal passage of the axle, said wheel lock being movable within the passage along the longitudinal axis between a first position and a second position, the wheel lock comprising one or more locking projections extending parallel to the axle;

wherein:
when the wheel lock occupies the first position, the one or more locking projections extend through corresponding apertures into an interior of the wheel and the wheel lock prevents the wheel from rotating about the longitudinal axis; and when the wheel lock occupies the second position, the one or more locking projections do not extend into the interior of the wheel and the wheel lock does not prevent the wheel from rotating about the longitudinal axis.

5. The wheel locking system of claim 4, wherein the wheel lock comprises:
a sliding lock member comprising an end-piece and an elongated first stem extending from the end-piece, the first stem inserted into the internal passage of the axle;
a sliding release member comprising an end and an elongated second stem extending from the end, the second stem inserted into the internal passage of the axle and engaged with the first stem; and
a detent member positioned within at least one of the first and second stems, the detent member having a portion that extends through an aperture within one of the first and second stems, the detent member portion configured to engage the axle so that the detent member prevents the wheel lock from moving between the first and second positions unless a longitudinal force exerted on the wheel lock exceeds a threshold force.

6. The wheel locking system of claim 5, wherein the end-piece includes the one or more locking projections, the one or more locking projections extending into one or more corresponding projection-receiving portions of the wheel when the wheel lock occupies its first position, the extension of the one or more locking projections into the one or more corresponding projection-receiving portions preventing the wheel from rotating about the axle.

7. The wheel locking system of claim 5, wherein:
the detent member comprises at least one flexible prong, said detent member portion comprising a detent projection extending substantially radially outwardly from the prong;
the axle comprises a tubular wall and first and second holes in the tubular wall, the first and second holes being longitudinally spaced apart and each positioned at a same circumferential location along the tubular wall;
the detent projection extends through the first hole when the wheel lock is in the first position; and
the detent projection extends through the second hole when the wheel lock is in the second position.

8. The wheel lock of claim 7, wherein the detent projection includes a first ramped surface facing the end-piece, and a second ramped surface facing the end of the sliding release member, each of the ramped surfaces configured to convert a longitudinal force on the ramped surface into a radially inward force on the projection.

9. The wheel lock of claim 8, wherein the threshold force is based at least in part on a stiffness of the detent projection or the flexible prong.

10. The wheel locking system of claim 5, wherein:
the detent member comprises a plurality of flexible prongs, each of the prongs including a projection extending substantially radially outwardly from the prong;
the axle comprises a tubular wall and multiple pairs of holes in the tubular wall, each pair of holes corresponding to one of the projections, each pair of holes comprising first and second holes that are longitudinally spaced apart and both positioned at a same circumferential location along the tubular wall;
each of the projections extends through the first hole of one of the pairs of holes when the wheel lock is in the first position; and
each of the projections extends through the second hole of one of the pairs of holes when the wheel lock is in the second position.

11. The wheel locking system of claim 5, wherein the first stem comprises one or more projection-engagement portions, and wherein the sliding release member comprises a plurality of flexible prongs each having an outwardly extending projection, the flexible prongs and projections configured to engage the one or more projection-engagement portions of the first stem.

12. The wheel locking system of claim 4, wherein the axle comprises first and second elongated axle portions engaged together and both oriented along the longitudinal axis.

13. A wheel locking system comprising:
an axle comprising an internal passage oriented along a longitudinal axis of the axle;
a wheel cover connected with respect to the axle, the wheel cover configured to cover a wheel rotatably engaged with the axle, the wheel cover including a sidewall at an end of the axle, the sidewall oriented generally transversely with respect to the axle, the sidewall including one or more apertures radially outward of the axle;
a wheel lock comprising a stem portion positioned within the internal passage of the axle, and an end-piece secured to the stem portion, the end-piece including one or more projections extending longitudinally toward the axle;

wherein:
the wheel lock is movable within the passage along the longitudinal axis between a first position and a second position;
the sidewall is interposed between the end-piece and the axle; and
when the wheel lock occupies its first position, the one or more projections of the end-piece extend through the one or more apertures of the sidewall into an interior of the wheel cover and the stem portion is disposed within the internal passage of the axle, and
when the wheel lock occupies its second position, the one or more projections of the end-piece do not extend into the interior of the wheel cover and the stem portion is disposed within the internal passage of the axle.

14. The wheel locking system of claim 13, further comprising a leg structure coupled to the wheel cover and configured to support a hose or cord reel device.

15. A wheel lock comprising:
a sliding lock member comprising an end-piece and an elongated first stem extending from the end-piece;
a sliding release member comprising an end and an elongated second stem extending from the end and configured to be engaged with the first stem, the end-piece and the end disposed at opposing ends of the wheel lock such that the elongated first stem and the elongated second stem are disposed between the end-piece and the end, wherein a distal portion of the elongated first stem is connected to a distal portion of the elongated second stem; and a detent member positioned within at least one of the first and second stems, the detent member having a projection that is biased to extend radially outwardly through a corresponding aperture within one of the stems, the projection configured to retract radially inwardly when a radially inward force exerted on the projection overcomes the radially outward bias of the projection.

16. The wheel lock of claim 15, wherein the projection includes a first ramped surface facing the end-piece, and a second ramped surface facing the end of the sliding release member, each of the ramped surfaces configured to convert a longitudinal force on the ramped surface into a radially inward force on the projection.

17. The wheel locking system of claim 15, wherein the first stem comprises one or more projection-engagement portions, and wherein the sliding release member comprises a plurality of flexible prongs each having an outwardly extending projection, the flexible prongs and projections configured to engage the one or more projection-engagement portions of the first stem.

18. The wheel locking system of claim 15, wherein the second stem of the sliding release member transmits a longitudinal force to the first stem of the sliding lock member when a force is applied to the end of the sliding release member in a direction parallel to the second stem.

19. The wheel locking system of claim 15, wherein the elongated first stem includes a first aperture and a second aperture between the first aperture and the end-piece, and wherein the end-piece includes one or more wheel-locking projections extending from the end-piece substantially parallel to the elongated first stem, the one or more wheel locking projections configured to extend into corresponding projection-engagement portions of a wheel when the projection of the detent member extends outwardly through the first aperture.

* * * * *